Aug. 28, 1962  O. P. HORNING  3,050,931
BATTERY OPERATED CLOCK WINDING MECHANISM
Filed Aug. 18, 1958  3 Sheets-Sheet 1
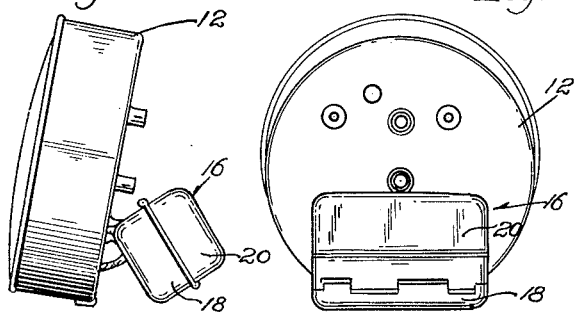
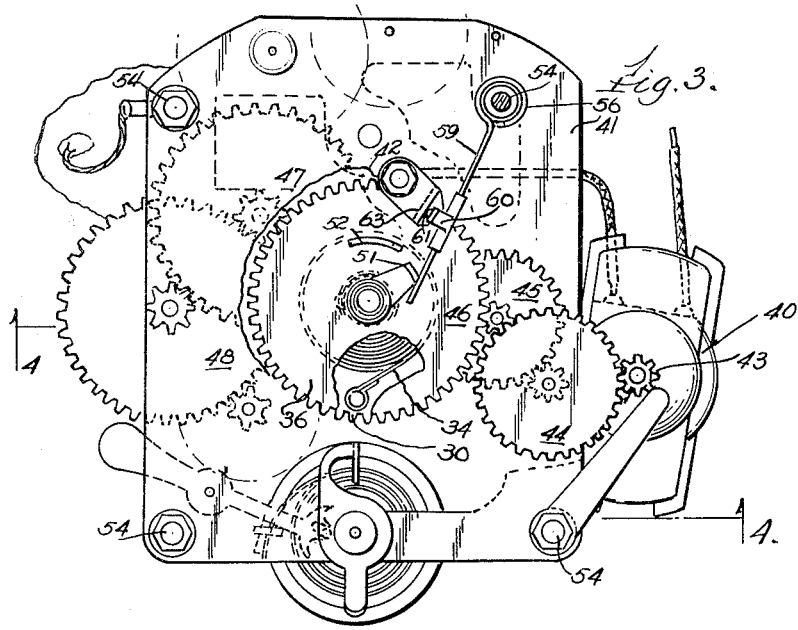
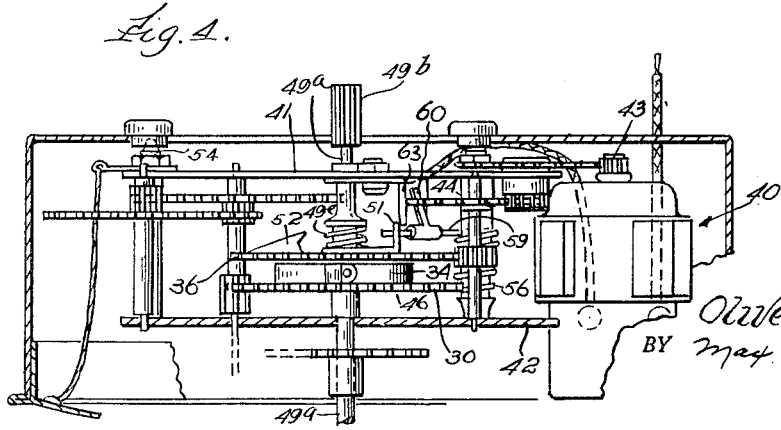
INVENTOR.
Oliver P. Horning
BY Max R. Kraus
Attorney.

Aug. 28, 1962 O. P. HORNING 3,050,931
BATTERY OPERATED CLOCK WINDING MECHANISM
Filed Aug. 18, 1958 3 Sheets-Sheet 2
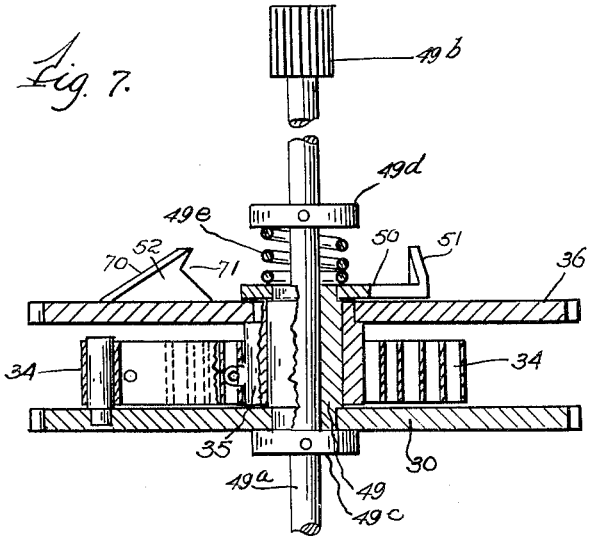
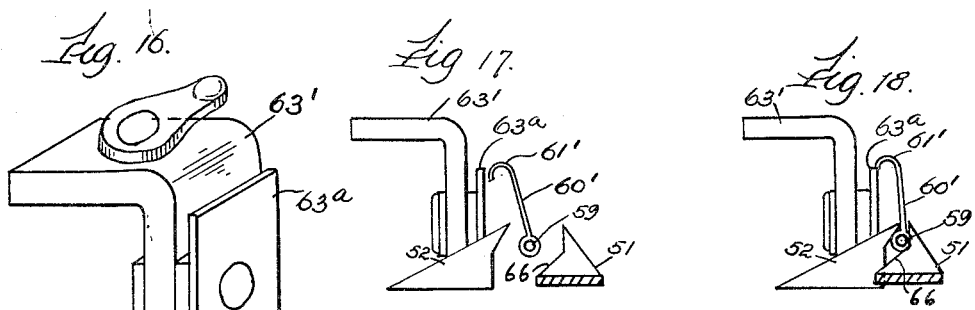
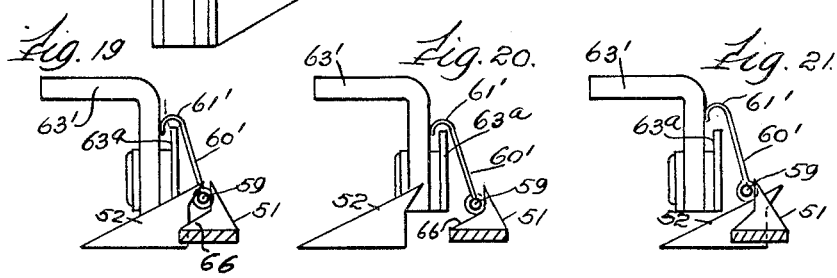
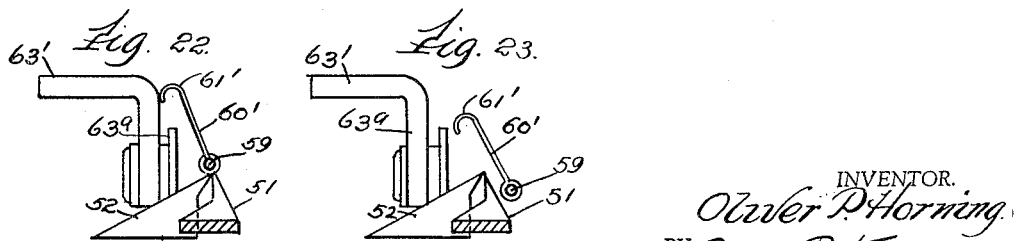
INVENTOR.
Oliver P. Horning
BY Max R. Kraus
Attorney.

Aug. 28, 1962  O. P. HORNING  3,050,931
BATTERY OPERATED CLOCK WINDING MECHANISM
Filed Aug. 18, 1958  3 Sheets-Sheet 3
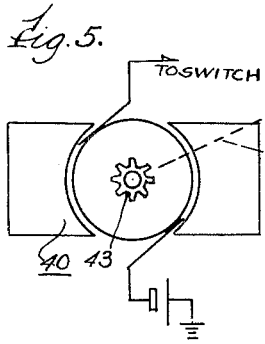
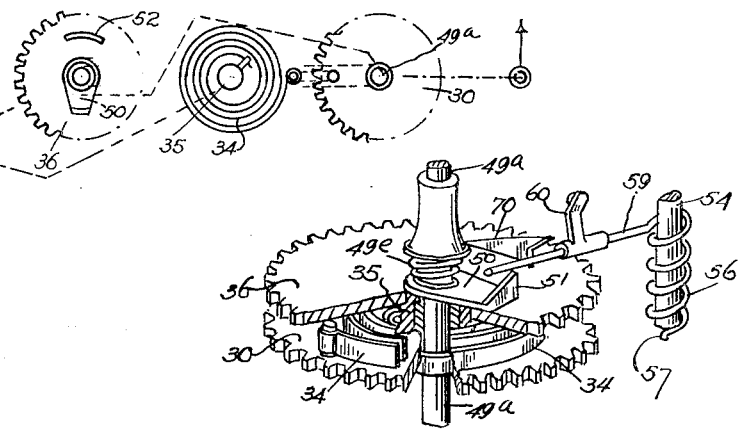
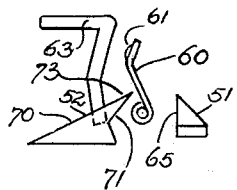
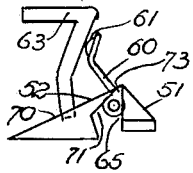
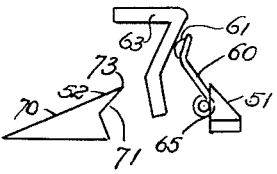
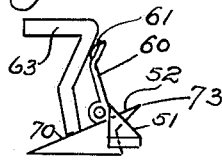
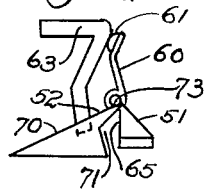
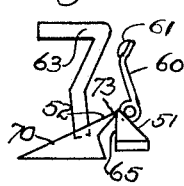
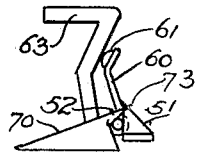
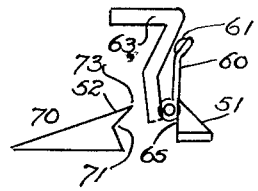
INVENTOR.
Oliver P. Horning
BY May R. Kraus
Attorney.

United States Patent Office 3,050,931
Patented Aug. 28, 1962

3,050,931
BATTERY OPERATED CLOCK WINDING
MECHANISM
Oliver P. Horning, Chicago, Ill., assignor of one-half to
Max R. Kraus, Chicago, Ill.
Filed Aug. 18, 1958, Ser. No. 755,508
5 Claims. (Cl. 58—41)

This invention relates to a battery operated clock and more particularly to a compact balance wheel type of clock having a small battery and electric motor means for energizing the clock to maintain the same in running condition over extended periods of time.

Conventional clocks of the balance wheel type have been on the market for many years. Such clocks have springs which require periodic rewind and may run from about 36 hours to as much as eight days upon one winding.

Electric clocks of the type using a synchronous motor have come into wide use and in many instances such electric clocks have replaced conventional spring-wound clocks. There are, however, many instances where a complete self-contained electric clock is desirable. This, of course, has resulted in a consideration of batteries as a source of power for such clocks.

A battery energized clock is of the type which is generally referred to as a direct current type of clock. Such a clock differs from an alternating type of clock in requiring mechanical means for performing the actual clock function, namely, rotating a gear or other members at an accurately controlled and constant speed. The simplest clock that may be powered by a battery is of the balance wheel type. As a rule, such a clock is provided with a main spring which is periodically rewound by electric means energized from the battery.

While many attempts have been made to provide a battery operated clock, such attempts have been unsuccessful for a number of reasons. For one thing, most clocks of this type have required rewinding at intervals of the order of a few minutes. Furthermore, the rewinding has generally utilized electromagnets and solenoids. These devices are extremely inefficient and consequently have imposed a serious drain upon the battery.

Another disadvantage of previous clocks relates to the switch mechanism for controlling the rewind. The switch mechanism has been delicate and has been a frequent source of trouble particularly in regard to maintaining good contact when the switch is closed.

This invention provides a mechanism which makes efficient use of a battery. The mechanism is rugged and positive in action and the switch forming part of the mechanism is positively actuated with substantial force so that excellent contact is maintained when the switch is closed. It must be remembered that a battery has a low output voltage and a small battery such as a flashlight cell will not deliver much power to a motor if the switch contacts are not in excellent condition. By virtue of applicant's invention, conventional wiping switch action may be utilized.

An important feature of the present invention resides in the fact that the rewind occurs every hour. By virtue of this arrangement, a minute gear or other means making one turn an hour will have substantial force for opening and closing switches and will also have a sufficient amplitude of movement for effective switch control. Somewhat similar effects may be obtained by utilizing a gear which makes a rotation every half hour or every two hours. However, since all clocks have a minute gear making one turn per hour, the use of such a gear for switch control involves a minimum of redesign or a clock with a maximum of switch efficiency.

By utilizing a highly efficient rotary type electric motor particularly one incorporating a permanent magnet field system, it has been found that the drain on the battery from such a motor in connection with hourly rewinds makes such efficient use of the battery that maximum battery life results.

As is well known, even when not used, a battery will gradually deteriorate, this being its shelf life. It is also well known that if heavy currents are drawn from a battery that correspondingly long rest periods are required for complete depolarization to occur within the battery.

The invention generally utilizes a conventional clock movement having a main spring for driving the clock. The main spring has one end coupled to a rewind gear and the other end coupled to a drive gear forming part of a conventional clock gear train. The drive gear preferably makes one revolution per hour and the rewind gear makes one revolution for a rewind cycle. The two gears are conveniently mounted on opposite sides of the main spring so that each gear has a free face. A normally open electric switch is disposed adjacent one gear face, such as the rewind gear face. In such case the driving gear is coupled to a switch closing finger for operation at a predetermined oriented drive gear position. The rewind gear is coupled to a finger operating to open the switch at a predetermined oriented finger position. The switch mechanism provides for definite switch closing and opening movements and is rugged and simple. The electric switch means cooperating with the switch closing finger also provides a detent action to prevent unwinding of the main spring beyond the general switch closing position in case of failure to rewind.

A further important feature of the invention resides in the use of a minature rotary type electric motor preferably having a permanent magnet field structure for rewind. The motor shaft is coupled to the rewind gear through a speed reduction gear train. By virtue of the great torque ratio, the gear train and motor armature provide an effective brake on the rewind gear to prevent unwinding of the main spring through the rewind gear.

A conventional balance wheel controlled type of escapement mechanism having a suitable main spring rewound hourly with a rotary type motor provides for a highly efficient use of the battery. It is necessary that the main spring be designed so that the electric motor can rewind without drawing excessive current. This is controlled by utilizing a main spring which, when fully wound, can run the clock mechanism for a period of several hours at the most and operating the main spring at a median level of energy storage. By virtue of this arrangement, the variation of clock accuracy due to variation in spring tension will be reduced to a minimum. Furthermore, the comparatively low energy level at which the main spring can receive energy from the electric motor will not impose an excessive load upon the motor.

A clock embodying the present invention requires a minimum redesign of conventional clocks now on the market. In order that the invention may be understood, reference will now be made to the drawings wherein:

FIGURE 1 is a side elevational view of the clock showing the battery operated housing used as a stand to support the clock.

FIGURE 2 is a rear elevational view of the clock.

FIGURE 3 is a rear elevational view of the clock with the housing removed to show the arrangement of the mechanism inside.

FIGURE 4 is a portion of a sectional view taken on the line 4—4 of FIGURE 3 and looking in the direction indicated.

FIGURE 5 is a diagrammatic representation illustrating the rewind and switch control system.

FIGURE 6 is a perspective view of the switch mechanism details, certain parts being broken away for clarity.

FIGURE 7 is a sectional view of the mechanism of FIGURE 6.

FIGURES 8 to 15 inclusive are illustrations showing the switch operating members in various positions.

FIGURES 16 to 23 inclusive show a modified switch in various positions.

Referring first to FIGURES 1 to 4 inclusive, a generally conventional clock movement is shown. For convenience the clock movement is of the balance wheel type and is in housing 12. The housing is shown as cylindrical for convenience, but like clock movements in general, the movement is generally independent of the housing. The clock housing illustrated here is of the desk type and is provided with battery housing 16 divided into two portions 18 and 20 hinged to each other to permit replacement of a battery.

Battery housing 16 is attached to the clock housing by any suitable means and in the particular type of clock housing here illustrated the battery housing functions as a back support. However, it is understood that the battery may be disposed in any postion and will be connected to the clock movement by wires.

As has been indicated, the clock movement is conventional insofar as the escapement and the gear train for driving the clock hands are concerned. It is also conventional in that the clock is driven by a main spring. The main spring is preferably of the conventional spiral ribbon type connected so that the inner end of the main spring is used for rewinding while the outer end of the main spring drives the clock. Main drive gear 30 which is connected to the outer end of main spring 34 drives the hour and minute hands and any additional indicating hands through suitable gears forming part of the clock movement.

The inner end of main spring 34 is attached to sleeve 35 which is press-fitted to rewind gear 36. Rewind gear 36 and drive gear 30 are in spaced offset, parallel relation and may be twins. If desired, drive gear 30 may carry a conventional spring barrel within which the main spring may be housed. In the construction here illustrated, drive gear 30 is a minute gear which makes one revolution per hour. For certain purposes, however, it may be desirable for this gear to make one revolution per half hour or every two hours.

The entire range of operation of the main spring, insofar as operating the clock is concerned, results in drive gear 30 making one complete turn after which the main spring is rewound. It is therefore necessary that drive gear 30 and rewind gear 36 both have a range of 360° for a complete cycle of operation insofar as switching and rewind are concerned. As illustrated here, and as seen in FIGURE 3, drive gear 30 and rewind gear 36 both turn counter-clockwise.

Referring to FIGURE 5, there is illustrated in diagrammatic form the rewind and switch control part of the clock system. The motive source of power for rewinding is a rotary type electric motor 40 suitably mounted between face plates 41 and 42 of the clock movement. Preferably motor 40 is a simple electric motor having a permanent magnet type of field structure. The motor itself is conventional and is provided with an armature having suitable windings and a commutator cooperating with brushes. Motor 40 carries pinion 43 which drives a conventional train of gearing 44, 45, 46, 47 and 48 to rewind gear 36. The speed reduction due to the train of gears provides a torque stepup back from rewind gear 36 toward the motor. Consequently, no one-way drive between the motor and rewind gear is necessary to prevent the main spring from unwinding. In practice, the train of gears which is essential for reducing the motor speed functions to brake the main spring as unwind is concerned.

As illustrated in FIGURE 5, rewind gear 36 is coupled to the inner end of spiral spring 34. The outer end of the spring is coupled to drive gear 30.

Referring specifically to FIGURES 6 and 7, sleeve 35 carries rigidly attached thereto rewind gear 36. Hence, rewind gear 36 and the inner end of coil spring 34 are rotatively coupled together. Inside of sleeve 35 is sleeve 49 which carries arm 50 rigidly attached thereto. Arm 50 is on the free side of rewind gear 36 and arm 50 carries at its end upraised switch operating finger 51. Sleeve 49 is rigidly attached to drive gear 30. Within sleeve 49 is spindle 49a which carries a minute hand at an end thereof. Spindle 49a is journalled in plates 41 and 42 in the usual fashion and carries clock reset knob 49b at the other end thereof. Collars 49c and 49d are rigidly attached to spindle 49 as shown. Clutch spring 49e is compressed between collar 49d and the outer face of arm 50. Collar 49d, spring 49e and arm 50 constitute a slip clutch for permitting reset of the clock hands through the switch operating means. Thus the orientation of the switch operating means with reference to the clock hands will not be disturbed. The automatic rewind can thus be designed to operate say on the hour, irrespective of clock resetting.

Rewind gear 36 has attached to the outer face thereof switch operating finger 52. As will be apparent later, finger 52 opens a switch and finger 51 causes the switch to close. Inasmuch as fingers 51 and 52 must be independently movable in a circular path at the free face of rewind gear 36, it is clear that the two fingers will be located at different distances from the axes of spindle 49a. As illustrated here, finger 51 moves over a circular path inside of the path of finger 52. This may be reversed. At this point it may be observed that finger 51 will turn slowly and continuously with the drive gear whereas finger 52 will move rapidly for one turn only during rewind.

The switch mechanism is specifically illustrated in FIGURES 6 to 15 inclusive. Referring specifically to FIGURES 4 to 7, face plates 41 and 42 are maintained in spaced rigid relation by a number of rods 54 having the ends provided with tapped recesses to accommodate screws. This construction is conventional in clock movements and the plates are generally drilled to provide bearings for the spindles of the various gears and parts.

One of the spacer rods 54 adjacent to the main spring assembly has disposed around it coil spring 56 having one end 57 bent to provide a locking finger for engaging an aperture in the face plate or for anchoring the coil spring against turning. Coil spring 56 has contact supporting portion 59 in the form of a spring arm extending laterally from support rod 54 to a position above the free face of rewind gear 30. Spring arm 59 supports movable electrical contact arm 60 of any suitable construction. Contact arm 60 is rigidly supported on spring arm 59 so that the contact arm will neither turn nor slide on spring arm 59.

Contact arm 60 may have any suitable shape and is provided with contact button 61. Contact button 61 is adapted to cooperate with stationary contact 63 insulatingly mounted in face plate 42 in any suitable manner. Thus stationary contact 63 may consist of a brass angle piece which may be carried by a bolt in plate 42. It is understood that means are provided for electrically insulating contact 63 from face plate 42. This may take the form of insulating washers with a clearance opening between a bolt and the supporting portion of contact arm 63 or may assume any other desired construction. Inasmuch as providing an insulating mount for a contact in a metal plate is old, no detailed description is deemed to be necessary.

Spring arm 59 is normally biased so that contacts 61 and 63 are open. In order to operate the switch, switch fingers 51 and 52 cooperate with the free end portion of spring arm 59.

Referring to contact finger 51, this is the finger which periodically closes the normally open switch. Finger 51 has leading face 65 as an operating face extending upwardly away from the free face of drive gear 30. Finger 51 also has sloping rear face 66.

Operating face 65 of finger 51 normally is at such a level as to encounter the free end of spring arm 59. As long as spring arm 59 is maintained at its normal separation from the free face of gear 36, leading face 65 of the finger will engage the spring arm and push the movable contact toward the fixed contact for closing the switch just before rewind time.

Switch closing finger 51 is moved by drive gear 30 toward a switch closing position and unless steps are taken to disengage the spring arm from the finger, the closed switch will tend to detain the drive gear from further movement.

In accordance with the present invention the switch construction is sufficiently rugged to permit such detent action to occur after some yielding of the movable switch contact occurs during switch closing. As drive gear 30 urges the movable contact against the stationary contact, spring arm 59, or the movable contact, or both will yield to permit the drive gear to operate for a comparatively short period of time while the switch is still closed. Such short period of time may be of the order of a fraction of a minute and should be long enough for a rewind cycle to occur.

Switch release finger 52 moves with rewind gear 36. Finger 52 has leading cam face 70 and trailing cam face 71. It should be noted that during rewind, leading cam face 70 is designed to engage the free end of spring arm 59 and elevate the arm from the free face of rewind gear 36. The switch contacts are so designed that this elevation may occur and provide a wiping action between contacts. Cam surface 70 of switch release finger 52 has tip 73 high enough relative to tip 74 of finger 51 so that during rewind, finger 52 which moves relatively fast will elevate the switch spring arm sufficiently to permit the spring arm to slide down reverse slope 66 of switch closing finger 51. This will occur after spring arm 59 has passed beyond tip 73 of switch opening finger 52.

Trailing cam surface 71 of switch opening finger 52 is provided with a concave shape to accommodate the initial switch closing movement of the spring arm due to finger 51. This is desirable since switch opening finger 52 will stop in the position illustrated in FIGURE 8. Once the switch is closed, the rewind motor operates and will turn rewind gear 36 through its 360° range in a part of a second as a rule, depending upon the condition of the battery. Thus after the switch is closed, the movement of finger 52 over from the switch contacts, as illustrated in FIGURE 10, is quite rapid. In FIGURE 11 the switch opening finger is forcing the spring arm up along its leading cam surface 70 and in FIGURE 13 the switch opening finger has functioned to release the spring arm from the switch closing finger. Thus it is clear that the switch opening finger 52 is really a release finger.

A wire connection between stationary contact 63 and the motor circuit will be provided. One terminal of the battery may be grounded and since movable contact 61 is grounded by means of its spring mounting, a motor circuit will be completed when the switch is closed. It is understood that the motor battery and switch contacts will be connected in series with one part of the circuit extending beween the mounted battery terminal and grounded switch contact 60.

During normal clock operation, when the spring operating cycle for running the motor is almost over, the contacts will be in the position illustrated in FIGURE 8. Switch closing finger 51 is just coming up behind the movable contact. Switch opening finger 52 is in the original position when the motor stopped for a previous rewind. FIGURE 9 shows the switch closing finger just beginning to close the switch with the spring arm extending into concave trailing edge 71. When the switch is closed as illustrated in FIGURE 9, the rewind motor is energized and switch opening finger 52 of the rewind gear is quickly moved as illustrated in FIGURE 10. As rewind occurs, finger 52 makes a complete revolution. Just before the 360° turn of the rewind gear occurs, the relative positions of the fingers and switch are as illustrated in FIGURES 11 and 12. FIGURE 12 shows the switch contacts just before the switch is tripped open. It will be noted that the movable switch contact has been elevated to provide a contact wiping action against the stationary contact while preparing the movable contact for a quick break.

FIGURE 13 shows the parts after the switch has been opened and shows the condition of the fingers during the normal rest position of the rewind motor. FIGURE 14 shows the position of the fingers in the event of no rewind at all with the switch functioning as a detent to stop clock operation. It will be noted that in FIGURE FIGURE 14, switch closing finger 51 has moved as far as it can. It should be understood in viewing these figures that fingers 51 and 52 move in different but concentric circular paths with the free end of the spring arm extending through both of the paths.

In FIGURE 15, the fingers are shown in one of any number of positions resulting from a partial or incomplete rewind. This may occur because of a weak battery or for other reasons.

Instead of having a concave trailing edge 71 for the switch opening or switch release finger 52, it is possible to have that part of the spring wire which engages finger 52 sufficiently flexible so that the movement of finger 51 will tend to bend the spring wire and permit the movable switch contact to be moved into closing position. However, the concave trailing edge of finger 52 provides a simple means for accommodating switch creepage and this permits each of the two fingers to move through a complete 360° during each operating cycle.

It is possible to have the switch operating fingers on the free face of the rewind gear in which case switch closing finger 51 will be carried directly on the drive gear, instead of being coupled thereto as shown. However, the arrangement illustrated in FIGURES 6 and 7 is preferred since it makes possible a simple clock reset without changing the timing of the rewind cycle with reference to the minute hand.

Referring now to FIGURES 16 to 23 inclusive, a modified switch structure is illustrated. Switch operating fingers 51 and 52 and spring arm 59 are the same. In the modification, stationary contact 63' has auxiliary insulated plate 63a spaced therefrom. Movable contact 60' has hook portion 61'. As seen in FIGURE 17, the switch is normally open. In FIGURE 18, finger 51 moves contact 60' against auxiliary plate 63a. The interaction of the fingers and spring arm causes the movable contact to climb over the top of auxiliary plate 63a and snaps the movable contact over the top edge of plate 63a and closes the switch (FIGURE 19). FIGURES 20 to 23 inclusive show the sliding contact action with the movable contact finally released. This modification provides a snap close of the switch.

It will be understood that various changes and modifications may be made from the foregoing without departing from the spirit and scope of the appended claims.

What is claimed is:

1. In a switch mechanism for controlling the winding of the main spring of an electrically wound clock, including a rewind gear and a drive gear coupled to said main spring so that the drive gear is driven by said spring, said switch including a pair of electrical contacts, one contact fixedly mounted on a portion of the clock and the other contact mounted on a support, said support pivotally and resiliently connected to said clock so that the support is normally in rest position out of contact with said fixed contact but may be moved toward and away from said fixed contact, a member coupled to said drive gear for periodically engaging said support and moving same away from its rest position and into engagement with said fixed contact when overcoming the biasing force offered by the resilient connection of the support with the clock, means coupled to said rewind gear and positioned to engage said support when said rewind gear is rotated to lift said support out of the path of said aforementioned member whereby said biasing force moves the support back to its rest position thereby breaking the engagement of the electrical contacts.

2. The apparatus set forth in claim 1 wherein the support comprises an arm, one end of said arm connected to a coil spring, which coil spring is connected to the clock, and an electrically conducting contact plate secured to said arm to form the contact member.

3. For use in a clock having a spring drive with the two ends of the spring being connected to suitable means and used for driving and rewind respectively, an electric motor coupled to said rewind end, and a switch structure for controlling said electric motor, said switch structure including operating means therefor, said operating means including concentric rotatable members coupled respectively to the drive and rewind ends of said spring, said drive member turning through one revolution as the clock runs from a position of full spring rewind to a run down position, said rewind member being adapted to make a complete turn in the same direction when said spring is rewound from the run down condition to the fully wound condition, a pair of fingers connected respectively to the drive and rewind members for movement in concentric circular paths at different radial distances from an axis, the drive finger making a slow complete turn as the clock runs down and the rewind finger making a faster complete turn upon rewind, a contact supporting arm for said switch, said contact supporting arm having a portion normally extending into the paths of movement of said fingers, said rewind finger being normally stationary and having its trailing face disposed adjacent to said contact supporting arm, said drive finger immediately after rewind being disposed in proximity to said contact supporting arm with its trailing face disposed adjacent to the contact supporting arm, from which position said drive finger travels in a circular path as the clock runs until the leading face of said drive finger approaches the contact supporting arm, means for biasing said contact supporting arm to maintain said switch in a normally open position and for disposing said arm directly in the path of said drive finger, means on said drive finger cooperating with the contact supporting arm for firmly engaging said contact supporting arm to move said arm as said drive finger moves to close the switch and maintain the same closed, said contact supporting arm permitting said drive finger to move after switch closure for a short time in comparison to the total operating period of the clock, said contact arm and drive finger cooperating to provide a detent action for the drive finger during switch closure and means on the leading face of said rewind finger cooperating with said switch arm to unlock said switch into a switch opening position after said rewind finger has made a complete turn and has come to rest in its normal position whereby in the event of a partial rewind or lack of rewind due to battery failure, said clock will not continue to run.

4. For use in a clock having a spring drive with the two ends of the spring being connected to suitable means and used for driving and rewind respectively, an electric motor coupled to said rewind end, and a switch structure for controlling said electric motor, said switch structure including operating means therefor, said operating means including concentric rotatable gears on opposite sides of the spring coupled respectively to the drive and rewind ends of said spring, said drive gear slowly making one turn as the clock runs from a position of full spring rewind, said rewind gear making a fast turn in the same direction when said spring is rewound, a pair of fingers connected respectively to the drive and rewind gears for rotary movement in generally coplanar paths at different radial distances from an axis and extending in the same direction, a contact supporting arm for controlling said switch, said contact supporting arm having a portion extending into the paths of movement of said fingers, said rewind finger being normally stationary and having a leading face providing a sloping cam face extending to the free end of said finger and having a trailing face disposed adjacent to said contact supporting arm, said drive finger immediately after rewind being disposed in proximity to said contact supporting arm with its trailing face disposed adjacent the contact supporting arm, from which position said drive finger slowly turns in a circular path as the clock runs until the leading face of said drive finger approaches the contact supporting arm, spring means for biasing said contact supporting arm to maintain said switch in a normally open position and for disposing said arm directly in the path of said drive finger, said drive finger leading face cooperating with the contact supporting arm for moving said contact supporting arm forwardly, as said drive finger turns, to close the switch contacts, said switch arm and drive finger cooperating to provide a detent action for the drive finger, and the leading face of said rewind finger cooperating with said switch arm to move said arm toward the free end of said fingers to provide contact wiping action and to open said switch after said rewind finger has made a turn and has come to rest in its normal position whereby in the event of a partial rewind or lack of rewind due to battery failure, said clock will not continue to run.

5. The construction according to claim 4 wherein said contact supporting arm is a spring wire extending from a stationary support laterally across the face of said gear and wherein the cooperating contact is a generally rigid metallic member, said two contacts being so shaped that when the contact arm rides along the sloping leading face of the rewind finger, the movable contact carried by the contact supporting arm is pressed firmly against the rigid contact and slides away from the gears to provide a wiping contact action.

References Cited in the file of this patent

UNITED STATES PATENTS

| | | |
|---|---|---|
| 355,434 | Broich | Jan. 4, 1887 |
| 362,902 | Pond | May 10, 1887 |
| 1,157,782 | Hummel | Oct. 26, 1915 |
| 1,605,674 | Manhein | Nov. 2, 1926 |
| 1,730,674 | Mettler | Oct. 8, 1929 |
| 1,733,689 | Lux | Oct. 29, 1929 |
| 2,221,594 | Lockwood | Nov. 12, 1940 |
| 2,651,908 | Fargo | Sept. 15, 1953 |

FOREIGN PATENTS

| | | |
|---|---|---|
| 141,090 | Switzerland | Sept. 16, 1930 |
| 572,207 | Great Britain | Sept. 27, 1945 |
| 1,029,905 | France | Mar. 11, 1953 |
| 743,744 | Great Britain | Jan. 25, 1956 |